United States Patent
Rosenberg et al.

(10) Patent No.: US 9,014,526 B2
(45) Date of Patent: Apr. 21, 2015

(54) WAVEGUIDE SYSTEM AND METHODS

(75) Inventors: Paul Kessler Rosenberg, Sunnyvale, CA (US); Michael Renne Ty Tan, Menlo Park, CA (US); Sagi Varghese Mathai, Palo Alto, CA (US); Arlen L. Roesner, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,036

(22) PCT Filed: Mar. 31, 2010

(86) PCT No.: PCT/US2010/029411
§ 371 (c)(1),
(2), (4) Date: Jan. 25, 2012

(87) PCT Pub. No.: WO2011/123111
PCT Pub. Date: Oct. 6, 2011

(65) Prior Publication Data
US 2012/0134638 A1    May 31, 2012

(51) Int. Cl.
| G02B 6/10 | (2006.01) |
| G02B 6/12 | (2006.01) |
| G02B 6/42 | (2006.01) |
| G02B 6/43 | (2006.01) |

(52) U.S. Cl.
CPC ... *G02B 6/43* (2013.01); *G02B 6/10* (2013.01)

(58) Field of Classification Search
CPC .......... G02B 6/12; G02B 6/122; G02B 6/132; G02B 6/0011; G02B 6/3839
USPC .................. 385/14, 50, 65, 83, 129–132, 136
See application file for complete search history.

(56) References Cited

U.S. PATENT DOCUMENTS

| 5,600,747 | A | * | 2/1997 | Yamakawa et al. ............. 385/59 |
| 6,104,264 | A | | 8/2000 | Ishikawa et al. |
| 2002/0031297 | A1 | | 3/2002 | Forrest et al. |
| 2003/0146807 | A1 | | 8/2003 | Higgins |
| 2003/0174998 | A1 | * | 9/2003 | Shevchuk .................. 385/137 |
| 2005/0089262 | A1 | * | 4/2005 | Jenkins et al. .................. 385/14 |
| 2005/0251994 | A1 | | 11/2005 | Yuasa |
| 2009/0087139 | A1 | | 4/2009 | Ty Tan et al. |
| 2009/0206473 | A1 | | 8/2009 | Lopez et al. |
| 2011/0019960 | A1 | * | 1/2011 | Matsubara et al. ............. 385/14 |
| 2011/0084047 | A1 | | 4/2011 | Yeo et al. |

FOREIGN PATENT DOCUMENTS

| CN | 1529187 | 9/2004 |
| CN | 1539091 A | 10/2004 |
| EP | 0357233 A2 | 3/1990 |
| EP | 2330683 A1 | 6/2011 |
| JP | 11308021 A1 | 11/1999 |
| JP | 2002358789 A | 12/2002 |
| JP | 2006145623 | 6/2006 |
| RU | 2200969 | 3/2003 |
| WO | WO-2005064739 | 7/2005 |
| WO | WO-2008105404 | 9/2008 |
| WO | WO-2009119850 | 10/2009 |
| WO | WO-2009120218 A1 | 10/2009 |

OTHER PUBLICATIONS

Tan M R T et al: "A High-Speed Optical Multidrop Bus for Computer Interconnections", IEEE Micro, IEEE Service Center, Los Alamitos, CA, US, vol. 29, No. 4, Jul. 1, 2009, pp. 62-73, XP011272521, ISSN: 0272-1732, DOI:10.1109/MM.2009.57, abstract; figure 3.

* cited by examiner

*Primary Examiner* — Kaveh Kianni
*Assistant Examiner* — Hung Lam
(74) *Attorney, Agent, or Firm* — Hewlett-Packard Patent Department

(57) ABSTRACT

Waveguide apparatuses and methods are provided. A waveguide method (700) can include stacking (710) a plurality of layers (110) to form a plurality of waveguides (120). Each of the plurality of layers can include at least one waveguide surface (140). The method can further include aligning (720) the plurality of layers using at least one alignment device (160). The method can also include trapping (730) the aligned, stacked plurality of layers between a first member (170) and second member (180).

21 Claims, 8 Drawing Sheets

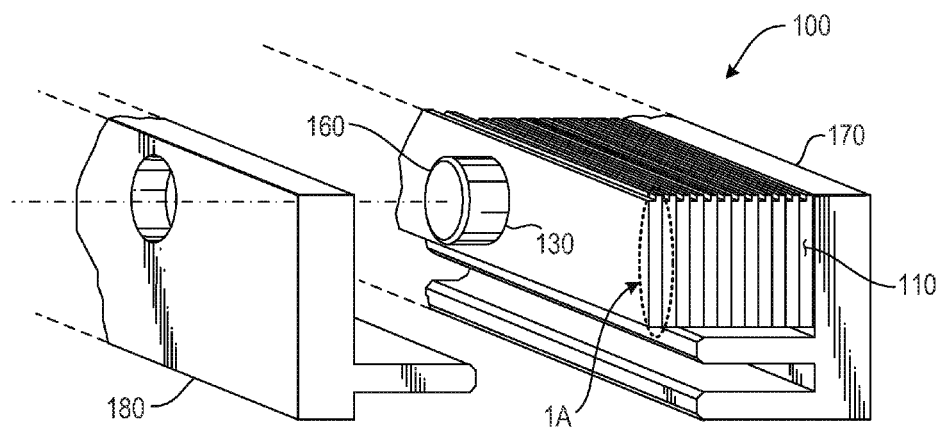
Fig. 1
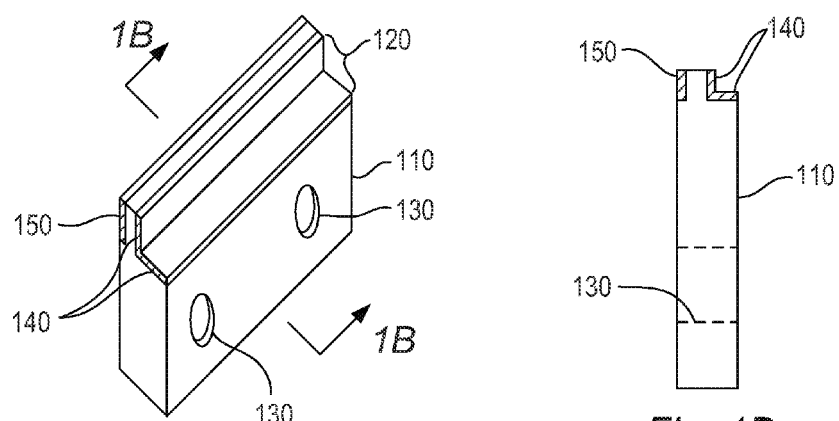
Fig. 1A
Fig. 1B

WAVEGUIDE SYSTEM AND METHODS

BACKGROUND OF THE INVENTION

Description of the Related Art

The use of optical signals, i.e. signals in whole or in part within the optical portion of the electromagnetic spectrum, continues to increase due to the tremendous improvement in bandwidth and the flexibility optical signals offer over traditional electrical signals. As optical signals increase their penetration and market share in communications applications formerly dominated by electrical signal transmission, the ability to transmit wide bandwidth optical signals in becomes critical to meeting the demands placed upon modern optics-based communication systems. While hollow-metal waveguides (HMWG) offer benefits for transmitting optical signals, their construction, application, and installation must often meet demanding requirements to ensure the integrity of the data transmitted along the waveguide.

BRIEF DESCRIPTION OF THE DRAWINGS

Advantages of one or more disclosed embodiments may become apparent upon reading the following detailed description and upon reference to the drawings in which:

FIG. 1 is a perspective view depicting an illustrative waveguide system, according to one or more embodiments described herein;

FIG. 1A is a perspective view depicting an illustrative waveguide layer, according to one or more embodiments described herein;

FIG. 1B is a sectional view depicting an illustrative waveguide layer from FIG. 1, according to one or more embodiments described herein;

DETAILED DESCRIPTION

Figure 2:
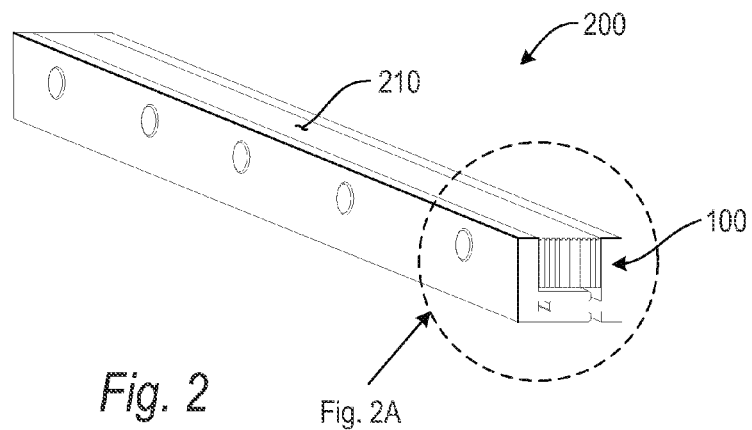
FIG. 2 is a perspective view depicting another illustrative waveguide system, according to one or more embodiments described herein.

High speed data transmission within a computing device can be accomplished using optical signals transmitted via waveguides. To minimize cost and improve reliability, optical data can be broadcast rather than transmitted from a source point to a destination point. Optical waveguides, particularly hollow metal waveguides, offer an efficient, reliable conduit for broadcasting due to the ease with which beam splitters can be introduced to the collimated optical beam. With waveguide spacing as little as 250 microns, fabrication of a large number of parallel optical waveguides using conventional compression or injection molding can be difficult.

A waveguide apparatus is provided. The waveguide apparatus can include a plurality of layers adapted to provide a plurality of waveguides. Each of the plurality of layers can include at least one alignment feature and at least one first waveguide surface. The apparatus can further include a first member and a second member, where the first member can be at least partially attached to the second member. At least a portion of the plurality of layers can be disposed between the first and second members. At least one alignment device can be disposed at least partially within the at least one alignment feature.

A waveguide method is also provided. The waveguide method can include stacking a plurality of layers to form a plurality of waveguides. Each of the plurality of layers can include at least one first waveguide surface. The method can further include aligning the plurality of layers using at least one alignment device. The method can also include trapping the aligned, stacked plurality of layers between a first member and second member.

For convenience and ease of discussion, FIGS. 1, 1A and 1B will be addressed collectively. FIG. 1 is a perspective view depicting an illustrative waveguide apparatus 100, according to one or more embodiments. FIG. 1A is a perspective view depicting an illustrative waveguide layer 110 used in the waveguide apparatus depicted in FIG. 1, according to one or more embodiments. FIG. 1B is a sectional view depicting an illustrative waveguide layer 110 used in the waveguide apparatus depicted in FIG. 1, according to one or more embodiments.

The waveguide apparatus 100 can include a plurality of layers 110 adapted to provide a plurality of waveguides 120. At least a portion of the layers 110 can include at least one alignment feature 130, disposed on, through, or about the layer 110. Each of the plurality of waveguides 120 can include at least one first waveguide surface 140. In one or more embodiments a second waveguide surface 150, as depicted in FIGS. 1A and 1B, can be disposed on all or a portion of the layers 110. The waveguide apparatus 100 can further include a first member 170 and a second member 180. At least a portion of the layers 110 can be trapped between the first member 170 and the second member 180. In some embodiments, to align the trapped layers 110, at least one alignment device 160 can pass through all or a portion of the alignment features 130 as depicted in FIG. 1. The first member 170 can be at least partially attached to the second member 180, for example through the use of an interconnecting a groove or channel disposed on the first member 170 with a complimentary tongue disposed on the second member 180 as depicted in FIG. 1.

Each of the layers forming the plurality of layers 110 can be a plastic or polymeric member, formed or otherwise produced using at least one injection molding technology, extrusion technology, compression molding technology, or the like. Such manufacturing technologies provide a rapid, cost effective, method for producing the plurality of layers 110. Since each layer 110 contains at least a portion of a single waveguide 120, issues related to alignment of multiple waveguides on a single member or surface can be minimized. Additionally, inherent flexibility is provided as any number of layers can be used to provide the plurality of layers 110, thereby providing any number of waveguides 120.

The thickness of each layer forming the plurality of layers 110 can be the same or different, i.e, the plurality of layers 110 forming the plurality of waveguides 120 can have the same or differing dimensions based upon system, user, or performance requirements. Each of the layers 110 can have a minimum thickness of about 100 µm or greater; about 200 µm or greater; about 300 µm or greater; about 400 µm or greater; or about 500 µm or greater. Each of the layers 110 can have an overall height of about 10 mm or greater; about 30 mm or greater; about 50 mm or greater; about 70 mm or greater; or about 90 mm or greater. Each of the layers 110 can have a length necessary to transmit or otherwise convey one or more optical signals a specified distance. For example, each of the layers 110 can have a thickness of approximately 250 µm, a length of several centimeters (cm) and a height of several millimeters (mm).

One or more alignment features 130 can be disposed in, on, or about all or a portion of the layers 110. In at least some embodiments, the use of one or more alignment features 130 can facilitate a precise alignment of the layers into a "stack" where each of the plurality of waveguides 120 lie parallel within a single plane, for example as depicted in FIG. 1. In some embodiments, the one or more alignment features 130 can be disposed in, on, or about each layer 110. Each of the plurality of layers 110, for example, can have a protruding alignment feature 130 that complimentarily fits within a corresponding recessed alignment feature 130 on an adjacent layer 110. In some embodiments, the alignment feature 130 can include an aperture having any shape, size or cross section, an illustrative circular aperture is depicted in FIGS. 1, 1A and 1B. In some embodiments, the alignment feature 130 can accommodate the passage of one or more alignment devices 160, for example one or more shafts, through all or a portion of the layers 110.

Each of the plurality of waveguides 120 can include at least one first waveguide surface 140. As depicted in FIGS. 1, 1A and 1B, in some embodiments, each layer 110 can include two normally disposed first waveguide surfaces 140. In other embodiments, any number of first waveguide surfaces 140 can be similarly disposed, for example a single first waveguide surface 140 can be disposed on each layer (discussed in greater detail with reference to FIGS. 5, 5A and 6). In other embodiments, three or more first waveguide surfaces 140 can be disposed in, on, or about each layer 110. Each of the first waveguide surfaces 140 can provide at least a portion of each waveguide 120.

In some embodiments, a coating can be disposed on at least a portion of the first waveguide surfaces 140. In some embodiments, the coating can be a reflective coating, having reflective properties at the wavelength or wavelengths of the optical signals transmitted within the plurality of waveguides 120. In some embodiments, the coating can include a reflective metallic coating. In some embodiment the coating disposed on the first waveguide surfaces 140 can include a mirror-like coating, a highly-polished coating, a reflective coating, or similar. In some embodiments the coating can be a reflective coating characterized by having a surface roughness of about 70 nm Ra or less; about 50 nm Ra or less; about 30 nm Ra or less; or about 20 nm Ra or less. In some embodiments, the coating can be applied at least a portion of the at least one first waveguide surface 140 using electrostatic deposition, vacuum deposition, or the like.

In some embodiments, each of the layers 110 can include a second waveguide surface 150. In at least some embodiments, at least a portion of the second waveguide surface can be disposed distal from all or a portion of the first waveguide surface 140. For example on the distal side of each of the plurality of layers 110 opposite the first waveguide surface 140 as depicted in FIGS. 1, 1A and 1B. Any number of second waveguide surfaces 150 can be similarly disposed, for example a single second waveguide surface 150 can be disposed on each layer 110. In other embodiments, a plurality of second waveguide surfaces 150 can be disposed in, on, or about each layer 110. Each of the second waveguide surfaces 150 can provide at least a portion of each of the plurality of waveguides 120.

In some embodiments, a coating can be disposed on at least a portion of the second waveguide surface 150. In some embodiments, the coating can be a reflective coating, having reflective properties at the wavelength or wavelengths of the optical signals transmitted within the plurality of waveguides 120. In some embodiments, the coating can include a reflective metallic coating. In some embodiment the coating disposed on the second waveguide surface 150 can include a mirror-like coating, a highly-polished coating, a reflective coating, or similar. In some embodiments the coating can be a reflective coating characterized by having a surface roughness of about 70 nm Ra or less; about 50 nm Ra or less; about 30 nm Ra or less; or about 20 nm Ra or less. In some embodiments, the coating can be applied at least a portion of the at least one second waveguide surface 150 using electrostatic deposition, vacuum deposition, or the like.

The at least one alignment device 160 can include any number of structures, devices, fixtures, or the like suitable for aligning at least a portion of the plurality of waveguides 120. For example, the at least one alignment device 160 can be used to align the plurality of waveguides 120 along a single plane as depicted in FIG. 1. In some embodiments, the at least one alignment device 160 can include a solid member, such as a pin or shaft as depicted in FIG. 1. In some embodiments, at least a portion of the at least one alignment device 160 can be attached to the first member 170, such an arrangement can permit the alignment of the plurality of layers 110 with the first member 170, thereby providing an integral, aligned, rigid, structure. To maintain the alignment of the plurality of layers 110, the geometry of the alignment feature 130 disposed on each layer can closely approximate the geometry of the alignment device 160.

The first member 170 can include any structure, device, or system adapted to support the plurality of layer 110. The first member 170 can include a rigid structure having any shape, size, length, or geometry. In at least some embodiments, the first member 170 can include one or more structures to facilitate or align the connection between the first member 170 and the second member 180, for example the first member 170 can have a surface feature such as a groove into which a complimentary surface feature such as a tongue disposed on the second member 180 can be inserted, engaged, joined, or otherwise connected.

In some embodiments, the first member 170 can include at least one metallic member, at least one non-metallic member, at least one composite member (e.g., a laminated metallic and non-metallic member), or any combination thereof. In at least some embodiments, the first member 170 can include one or more one injection molded members, one or more extrusion molded members, one or more compression molded members, or the like.

Similar to the first member 170, the second member 180 can include any structure, device, or system adapted to support the plurality of layer 110. The second member 180 can include a rigid structure having any shape, size; length, or geometry. In at least some embodiments, the second member 180 can include one or more structures to facilitate or align the connection between the first member 170 and the second member 180, for example the second member 180 can have a surface feature such as a tongue which can be inserted into a complimentary groove disposed on the first member 170. In some embodiments, the second member 180 can include one or more features, for example one or more apertures as depicted in FIG. 1, to accommodate all or a portion of the at least one alignment device 160.

In some embodiments, for example as depicted in FIG. 1, at least a portion of the at least one alignment device 160 can pass through and extend or protrude from all or a portion of the plurality of layers 110. Where at least a portion of the at least one alignment device 160 protrudes from the plurality of layers 110, one or more complimentary features, for example complimentary apertures, can be disposed in, on, or about the second member 180 to accommodate the at least one alignment device 160.

At least a portion of the first member 170 can be detachably or non-detachably attached to the second member 180. Such attachment can be accomplished using a variety of attachment methods such as the tongue and groove friction attachment method discussed in detail above. Alternative methods of attachment are also possible, for example attachment using at least one latch, attachment using at least one clamp, attachment using at least one threaded fastener, attachment using an adhesive, attachment using a chemical weld, and attachment using a thermal weld.

Figure 2A:
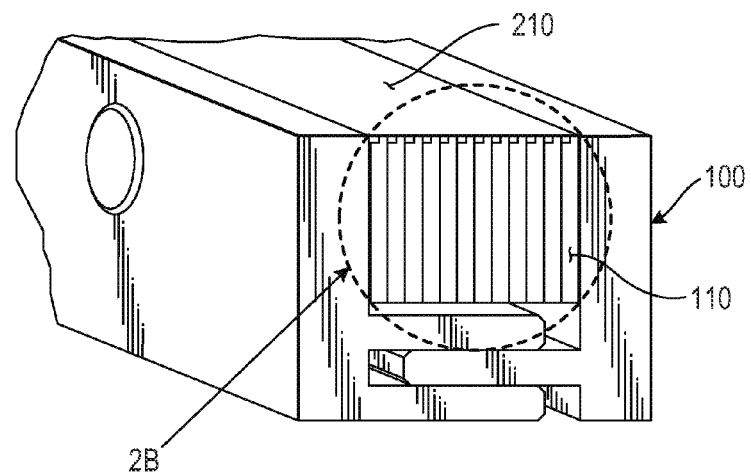
FIG. 2A is a perspective view depicting the illustrative waveguide layer depicted in FIG. 2, according to one or more embodiments described herein.
Figure 2B:
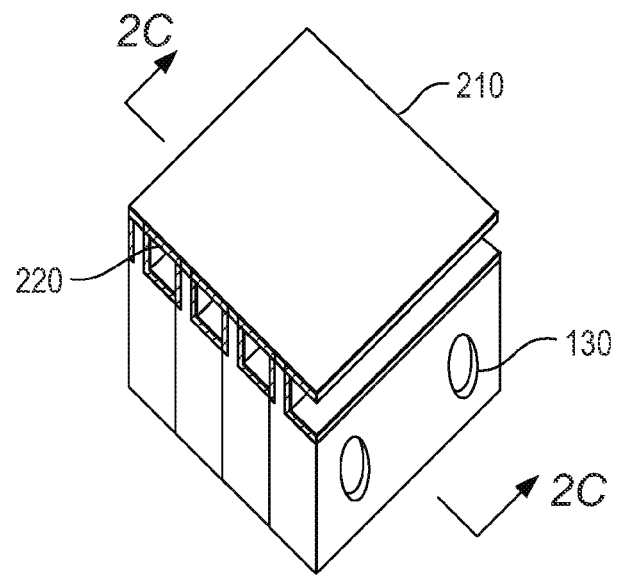
FIG. 2B is a perspective view depicting an illustrative plurality of waveguide layers from the waveguide system depicted in FIG. 2, according to one or more embodiments described herein.
Figure 2C:
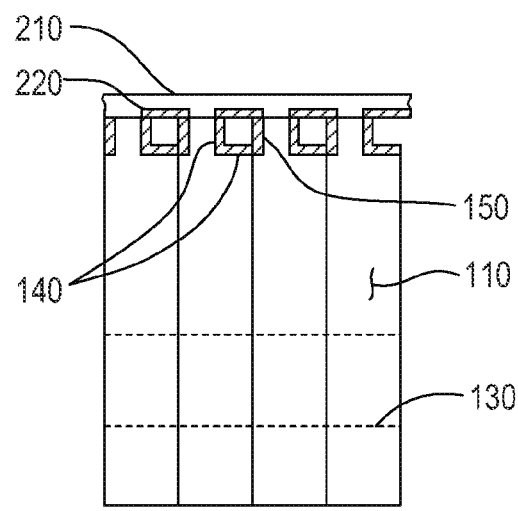
FIG. 2C is a sectional view depicting an illustrative plurality of waveguide layers from the waveguide system depicted in FIG. 2, according to one or more embodiments described herein.

For convenience and ease of discussion, FIGS. 2, 2A, 2B, and 2C will be addressed collectively. FIG. 2 is a perspective view depicting another illustrative waveguide system 200, according to one or more embodiments. FIG. 2A is a perspective view depicting the illustrative waveguide system 200 depicted in FIG. 2, according to one or more embodiments. FIG. 2B is a perspective view depicting the illustrative plurality of waveguide layers 110 from the waveguide system 200 depicted in FIG. 2, according to one or more embodiments. FIG. 2C is a sectional view depicting an illustrative plurality of waveguide layers 110 from the waveguide system 200 depicted in FIG. 2, according to one or more embodiments.

The waveguide system 200 can include a cover member 210 disposed proximate all or a portion of the plurality of layers 110 and the plurality of waveguides 120. In at least some embodiments, a waveguide surface 220 can be disposed on or about all or a portion of the cover member 210. In some embodiments, the waveguide surface 220 can be disposed proximate each of the plurality of waveguides 120, thereby forming at least a portion of the interior surface of at least a portion of the plurality of waveguides 120. For example, as depicted in FIGS. 2B and 2C, each of the plurality of waveguides 120 can include four surfaces forming a square or rectangular waveguide where two first waveguide surfaces 140 are provided by a layer 110, a single second waveguide surface 150 is provided by an adjacent layer 110, and the remaining waveguide surface 220 is provided by the cover member 210.

In some embodiments, a coating can be disposed on at least a portion of the cover member 210. In some embodiments, the coating can be a reflective coating, having reflective properties at the wavelength or wavelengths of the optical signals transmitted within the plurality of waveguides 120. In some embodiments, the coating can include a reflective metallic coating. In some embodiment the coating disposed on the cover member 210 can include a mirror-like coating, a highly-polished coating, a reflective coating, or similar. In some embodiments the coating can be a reflective coating characterized by having a surface roughness of about 70 nm Ra or less; about 50 nm Ra or less; about 30 nm Ra or less; or about 20 nm Ra or less. In some embodiments, the coating can be applied at least a portion of the cover member 210 using electrostatic deposition, vacuum deposition, or the like.

In some embodiments, the cover member 210 can be trapped or otherwise held in place proximate the plurality of waveguides 120 by the first member 170 and the second member 180. For example, in some embodiments, the cover member 210 can be held proximate the plurality of waveguides 120 by a friction fit between the first member 170 and the second member 180. In other embodiments, slots, channels, grooves or the like can be disposed in the surface of the first member 170 and the second member 180.

Figure 3:
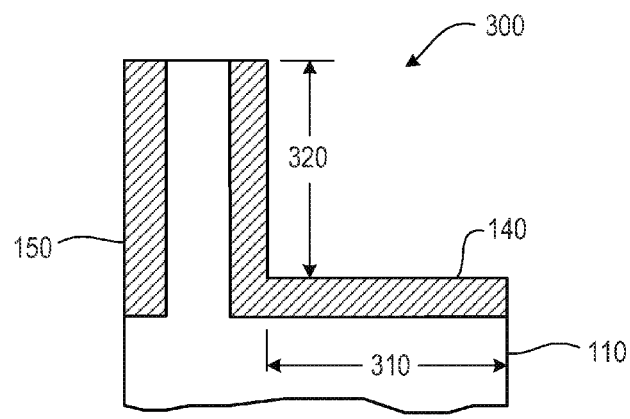
FIG. 3 is a partial sectional view depicting a layer having an illustrative first waveguide surface and an illustrative second waveguide surface, according to one or more embodiments described herein.

FIG. 3 is a partial sectional view depicting a layer 110 having an illustrative first waveguide surface 140 and second waveguide surface 150, according to one or more embodiments. In some embodiments, each of the plurality of waveguides 120 can include a plurality of square or rectangular waveguide surfaces, where the first waveguide surface 140 can have a width 310 of from about 50 μm to about 500 μm; about 75 μm to about 400 μm; about 100 μm to about 300 μm. In some embodiments, each of the plurality of waveguides 120 can include a plurality of square or rectangular waveguide surfaces, where the first waveguide surface 140 can have a height 320 of from about 50 μm to about 500 μm; about 75 μm to about 400 μm; about 100 μm to about 300 μm.

Figure 4:
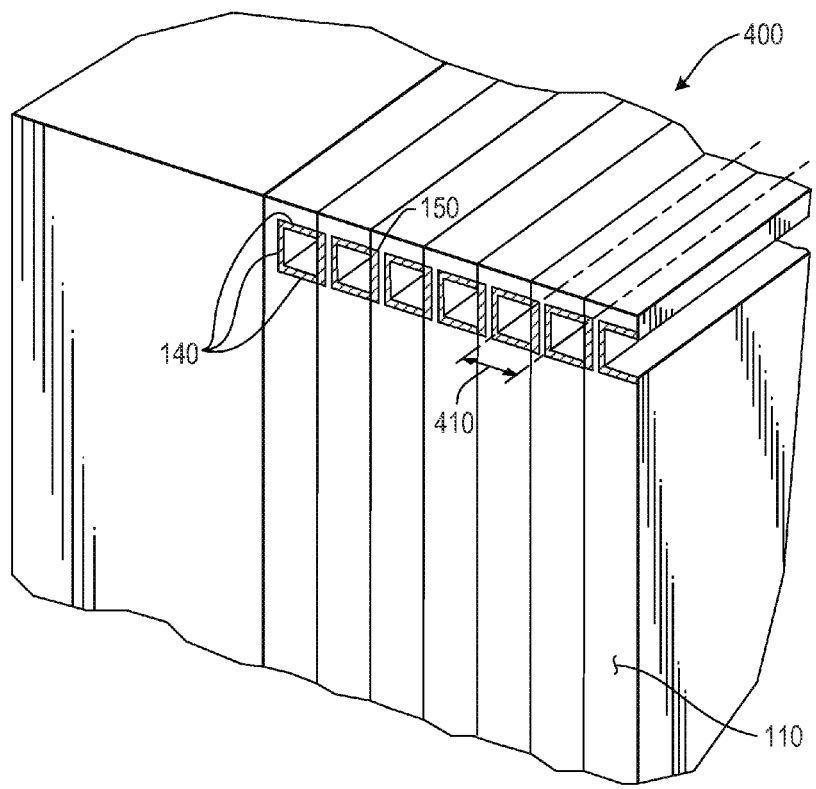
FIG. 4 is a partial sectional view depicting another illustrative waveguide system, according to one or more embodiments described herein.

FIG. 4 is a partial sectional view depicting another illustrative waveguide system 400, according to one or more embodiments. The waveguide system 400 can include a plurality of layers 110, each layer having three orthogonal first waveguide surfaces 140 and a single second waveguide surface 150. The disposal of three orthogonal first waveguide surfaces 140 can obviate the need for a separate cover member 210, thereby simplifying the construction of the waveguide system 400.

The thickness of each layer forming the plurality of layers 110 can vary as discussed in detail above. The thickness of each layer forming the plurality of layers 110 can therefore be used to provide any desired center-to-center spacing 410 of the waveguides forming the plurality of waveguides 120. The waveguides forming the plurality of waveguides 120 can have a center-to-center spacing 410 of from about 50 μm to about 1 mm; about 100 μm to about 700 μm; or about 150 μm to about 400 μm. In at least some embodiments, the waveguides forming the plurality of waveguides 120 can have a center-to-center spacing 410 of about 250 μm.

Figure 5:
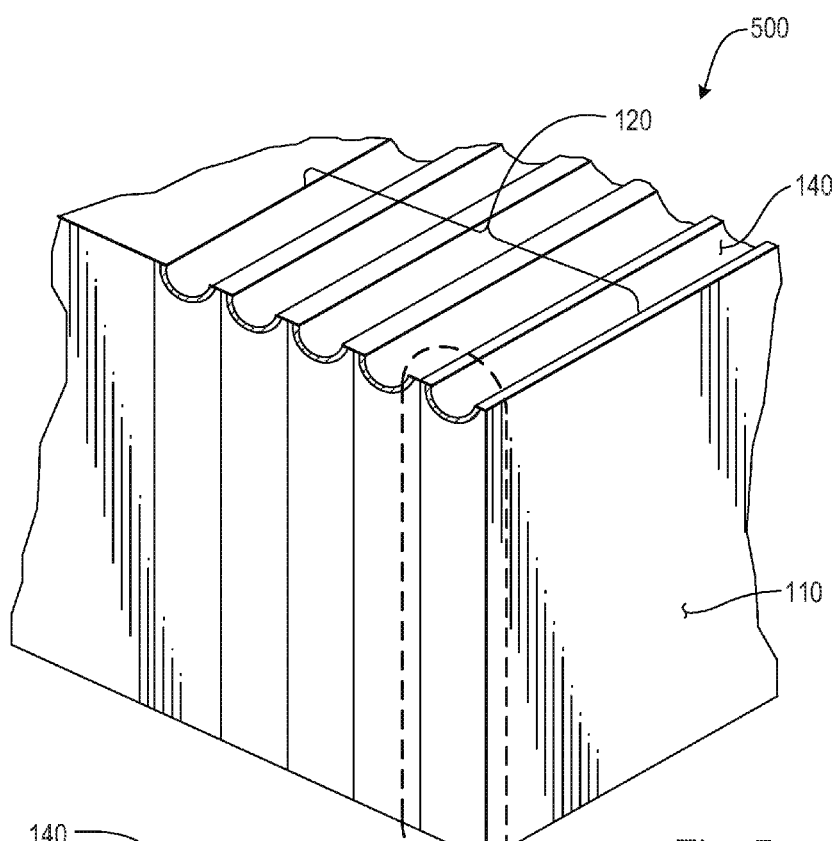
FIG. 5 is a partial perspective view depicting another illustrative waveguide system, according to one or more embodiments described herein.
Figure 5A:
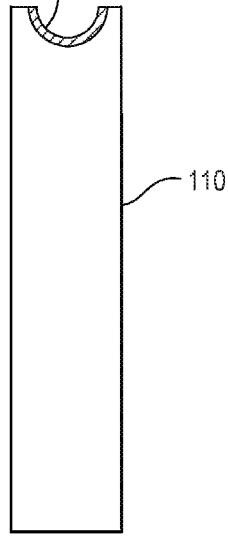
FIG. 5A is an elevation view depicting an illustrative waveguide layer used in the waveguide system depicted in FIG. 5, according to one or more embodiments described herein.

For convenience and ease of discussion, FIGS. 5 and 5A will be addressed collectively. FIG. 5 is a partial perspective view depicting another illustrative waveguide system 500, according to one or more embodiments. FIG. 5A is an elevation view depicting an illustrative layer 110 used in the waveguide system 500 depicted in FIG. 5, according to one or more embodiments. As depicted in FIGS. 5 and 5A in at least some embodiments, the first waveguide surface 140 can include a single surface disposed entirely upon a single layer 110. As depicted in FIGS. 5 and 5A, in some embodiments, the first waveguide surface 140 can be a non-planar surface, for example a semi-circular surface. The use of an adjacent layer 110 to provide the second waveguide surface 150 can be superfluous where the first waveguide surface 140 provides a significant portion of the waveguide 120.

A waveguide system can be formed using the semicircular waveguide layers 110 depicted in FIGS. 5 and 5A by trapping a plurality of layers 110 between a first member 170 and a second member 180, and by disposing a cover member 210 proximate the plurality of semicircular waveguides 120. In some embodiments, as described previously, a coating, for example a reflective coating, can be disposed on at least a portion of the waveguide surface 220 proximate each of the plurality of semicircular waveguides 120.

Figure 6:
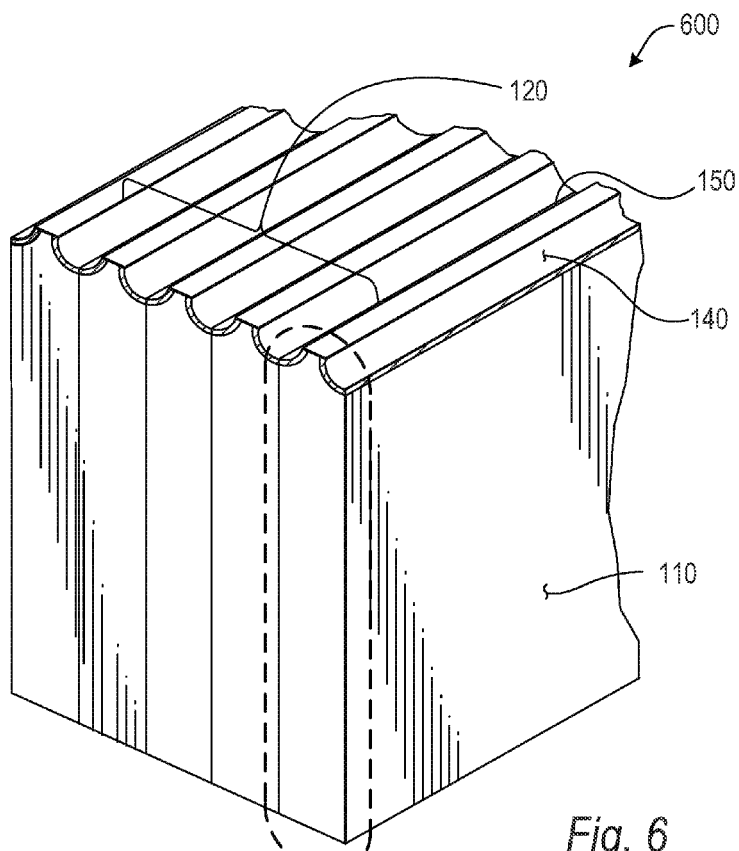
FIG. 6 is a partial perspective view depicting yet another illustrative waveguide system, according to one or more embodiments described herein.
Figure 6A:
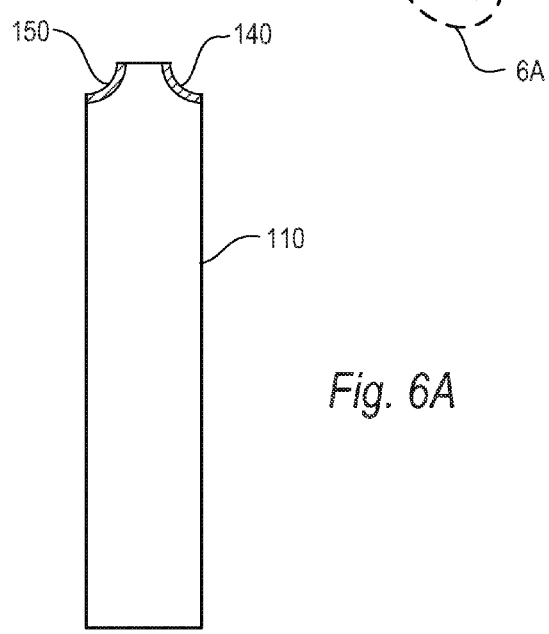
FIG. 6A is an elevation view depicting an illustrative waveguide layer used in the waveguide system depicted in FIG. 6, according to one or more embodiments described herein.

For convenience and ease of discussion, FIGS. 6 and 6A will be addressed collectively. FIG. 6 is a partial perspective view depicting yet another illustrative waveguide system 600, according to one or more embodiments. FIG. 6A is an elevation view depicting an illustrative waveguide layer 110 used in the waveguide system 600 depicted in FIG. 6, according to one or more embodiments. As depicted in FIGS. 6 and 6A in at least some embodiments, the first waveguide surface 140 can include a single non-planar surface and the second waveguide surface 150 can include a single non-planar surface, both disposed upon a single layer 110. As depicted in FIGS. 6 and 6A, in at least some embodiments, the first waveguide surface 140 and the second waveguide surface can include "mirror-image" semicircular surfaces disposed on opposing sides of each of the plurality of layers 110. When disposed proximate another layer, the first waveguide surface 140 on the first layer and the second waveguide surface 150 on the adjacent layer can together provide a semicircular waveguide surface.

A waveguide system can be formed using the waveguide layers 110 depicted in FIGS. 6 and 6A by trapping a plurality of such layers 110 between a first member 170 and a second member 180, and by disposing a cover member 210 proximate the plurality of semicircular waveguides 120 formed by the plurality of layers 110. In some embodiments, as described previously, a coating, for example a reflective coating, can be disposed on at least a portion of the waveguide surface 220 proximate each of the plurality of semicircular waveguides 120.

Figure 7:
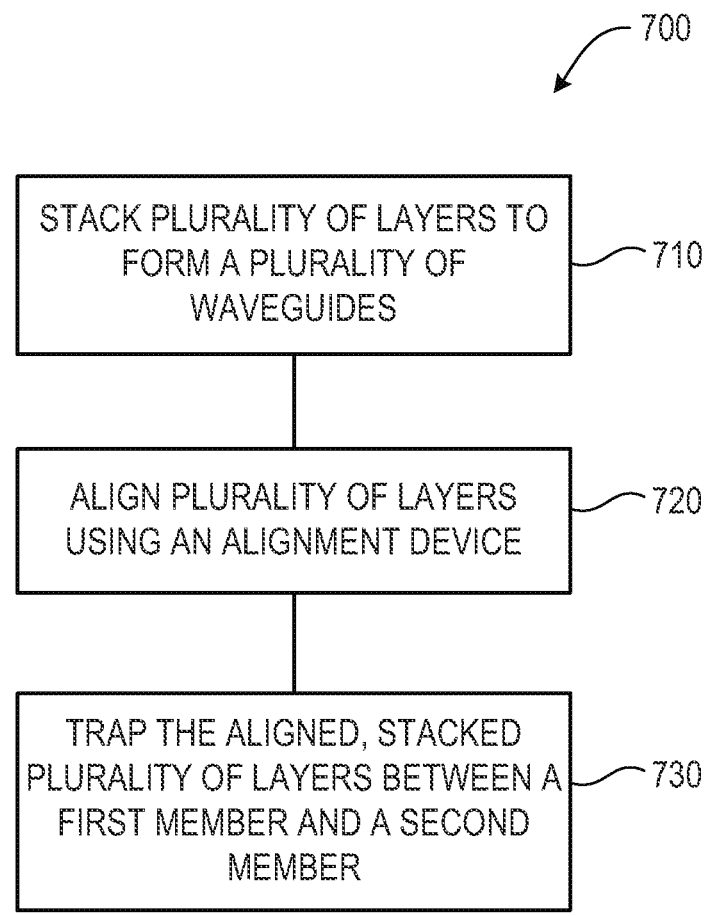
FIG. 7 is a flow diagram depicting an illustrative waveguide method, according to one or more embodiments described herein.

FIG. 7 is a flow diagram depicting an illustrative waveguide method 700, according to one or more embodiments. In some embodiments, the method 700 can include stacking a plurality of layers 110 to form a plurality of waveguides 120. The layers 110 can include a first waveguide surface 140: a second waveguide surface 150, or any combination of first and second waveguide surfaces. In some embodiments, at least a portion of the waveguide surfaces can be formed using two adjacent layers 110, where, in some embodiments, the first layer provides the first waveguide surface 140 and an adjacent layer provides the second waveguide surface 150.

The plurality of layers 110 can be aligned using at least one alignment device 160 at 720. In some embodiments, the alignment can be accomplished by passing, disposing, or otherwise engaging at least a portion of the at least one alignment device 160 with or through one or more alignment features 130 disposed in, on, or about the plurality of layers 110. In some embodiments, the at least one alignment device can be attached to the first member 170, the second member 180, or both the first member and the second member.

The aligned, stacked, plurality of layers 110 can be at least partially trapped between the first member 170 and the second member 180 at 730. In at least some embodiments, the aligned, stacked, plurality of layers 110 can provide a plurality of parallel waveguides 120.

Figure 8:
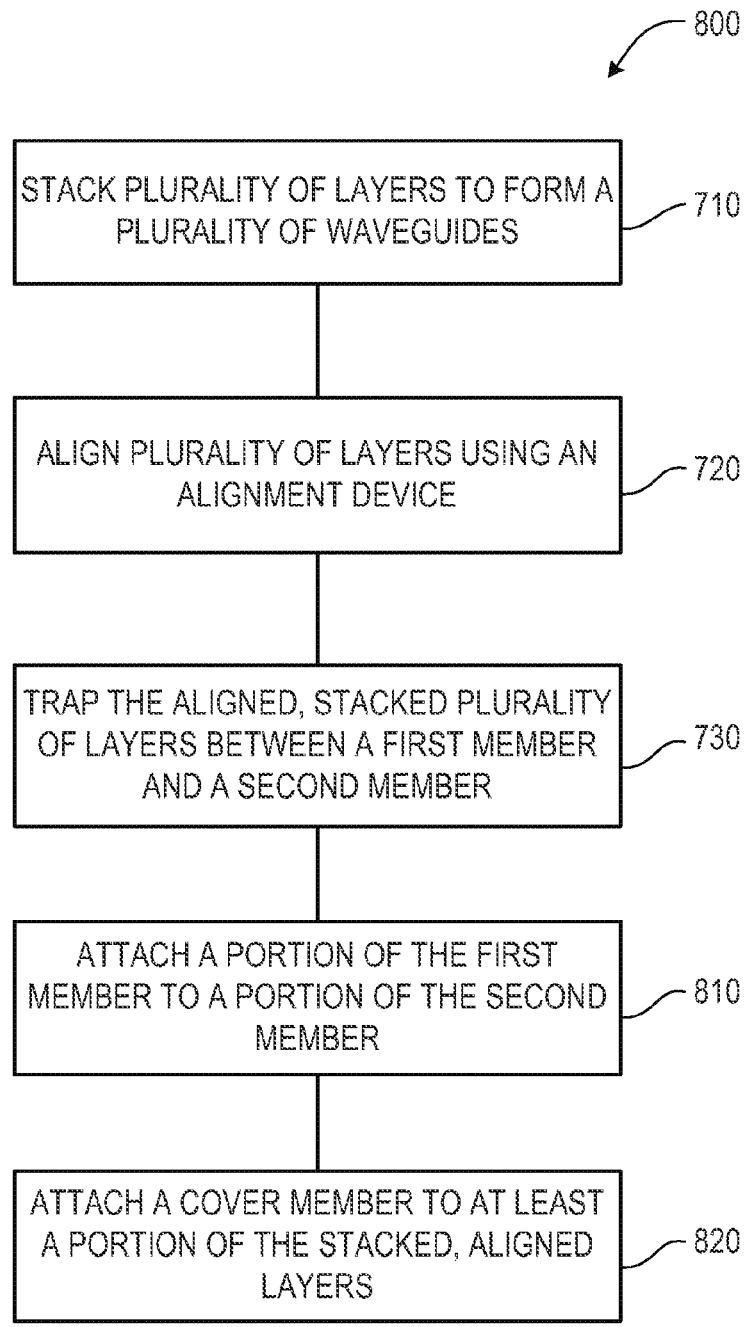
FIG. 8 is a flow diagram depicting another illustrative waveguide method, according to one or more embodiments described herein.

FIG. 8 is a flow diagram depicting another illustrative waveguide method 800, according to one or more embodiments. The first member 170 and the second member 180 trapping the stacked, aligned plurality of layers 110 at 730 can be at least partially attached to each other at 810. Such attachment can occur, for example, through the use of at least one latch, at least one clamp, at least one threaded fastener, an adhesive, a chemical weld, a thermal weld, or the like. The attachment of the first member to the second member can provide a sturdy, rigid, structure having a plurality of waveguides 120 disposed between the first and second members.

A cover member 210 can, in some embodiments, be disposed proximate at least a portion of the stacked, aligned plurality of layers 110 at 820. In some embodiments, the cover member 210 can include one or more reflective surfaces 220 proximate at least a portion of the plurality of waveguides 120.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to embodiments of the present invention, other and further embodiments of the invention may be devised without departing from the basic scope thereof, and the scope thereof is determined by the claims that follow.

We claim the following:

1. A waveguide apparatus, comprising:
 a plurality of layers arranged to provide a plurality of waveguides, each of the plurality of waveguides extending in a direction parallel to one another in a direction of light travel and in a single plane, each of the plurality of layers forming a part of at least one respective waveguide;
 wherein each of the plurality of layers comprises at least one alignment feature within the respective layer thereof and at least one first waveguide surface, the alignment feature being separate from the at least one first waveguide surface;
 a first member and a second member;
 wherein the first member is at least partially attached to the second member; and
 wherein at least a portion of the plurality of layers is disposed between the first and second members; and
 at least one alignment device disposed at least partially within the at least one alignment feature.

2. The apparatus of claim 1, further comprising a second waveguide surface disposed on at least a portion of the plurality of layers; wherein at least a portion of the plurality of waveguides comprise the second waveguide surface.

3. The apparatus of claim 1, further comprising a cover member comprising at least one waveguide surface.

4. The apparatus of claim 1, wherein the first member and the second member are at least partially attached using an attachment method selected from the group of attachment methods consisting of: attachment using at least one latch, attachment using at least one clamp, attachment using at least one threaded fastener, attachment using an adhesive, attachment using a chemical weld, and attachment using a thermal weld.

5. A waveguide method, comprising:
stacking a plurality of layers to form a plurality of waveguides, each of the plurality of waveguides extending in a direction parallel to one another in a direction of light travel and in a single plane, each of the plurality of layers forming part of at least one respective waveguide;
wherein each of the plurality of layers comprises at least one alignment feature within the respective layer thereof and at least one first waveguide surface, the alignment feature being separate from the at least one first waveguide surface;
aligning the plurality of layers via at least one alignment device; and
trapping the aligned, stacked plurality of layers between a first member and second member.

6. The method of claim 5, wherein at least a portion of the plurality of layers further comprise a second waveguide surface disposed on at least a portion of the plurality of layers;
at least a portion of the plurality of waveguides comprise the second waveguide surface.

7. The method of claim 5, further comprising:
attaching at least a portion of the first member to the second member.

8. The method of claim 5, further comprising:
attaching a cover member comprising at least one waveguide surface to at least a portion of the plurality of layers.

9. The method of claim 5,
wherein each of the plurality of layers comprises a thermoplastic member; and
wherein the thermoplastic member is selected from the group of thermoplastic members consisting of: an injection molded member and an extruded member and a compression molded member.

10. The method of claim 5, wherein each of the alignment devices comprises at least one surface feature attached to the first member.

11. The method of claim 10,
wherein each of the alignment devices comprises at least one projecting surface feature attached to the first member;
wherein each of the layers further comprises at least one alignment feature within the layer, the at least one alignment feature including an aperture adapted to accommodate the passage of at least a portion of at least one alignment device; and
wherein the second member further comprises at least one aperture adapted to accommodate the passage of at least a portion of at least one alignment device.

12. The method of claim 7,
wherein attaching at least a portion of the first member to the second member comprises non-detachably attaching at least a portion of the first member to at least a portion of the second member; and
wherein non-detachably attaching at least a portion of the first member to at least a portion of the second member comprises an attachment method selected from the group of attachment methods consisting of: an adhesive-based attachment method, a chemical weld-based attachment method, and a thermal weld based attachment method.

13. The method of claim 7,
wherein attaching at least a portion of the first member to the second member comprises detachably attaching at least a portion of the first member to at least a portion of the second member; and
wherein detachably attaching at least a portion of the first member to at least a portion of the second member comprises an attachment method selected from the group of attachment methods consisting of: at least one clamp, at least one latch, and at least one threaded fastener.

14. The method of claim 5 further comprising fabricating the first waveguide surface to a finish, characterized by a surface roughness in the range of 30 nm Ra or less.

15. The method of claim 5, wherein the plurality of waveguides comprise a width of from about 100 µm to about 300 µm and a height of from about 100 µm to about 300 µm.

16. The method of claim 5, wherein the plurality of waveguides comprise a center-to-center spacing of from about 150 µm to about 400 µm.

17. The apparatus of claim 1, wherein each of the plurality of waveguides is a hollow-metal waveguide.

18. The apparatus of claim 1, wherein the second member includes a complimentary aperture to accommodate the at least one alignment device.

19. The apparatus of claim 2, wherein a first waveguide surface of a first layer of the plurality of layers and a second waveguide surface of a second layer of the plurality of layers combine to form a first waveguide of the plurality of waveguides, the first layer being adjacent to the second layer.

20. The apparatus of claim 1, wherein the wave guide apparatus further comprises a single cover forming another part of each of the plurality of waveguides.

21. The method of claim 5, wherein the plurality of layers are provided with a single cover, the single cover forming at least a part of each of the plurality of waveguides.

* * * * *

UNITED STATES PATENT AND TRADEMARK OFFICE
CERTIFICATE OF CORRECTION

PATENT NO. : 9,014,526 B2  
APPLICATION NO. : 13/387036  
DATED : April 21, 2015  
INVENTOR(S) : Paul Kessler Rosenberg et al.

Page 1 of 1

It is certified that error appears in the above-identified patent and that said Letters Patent is hereby corrected as shown below:

In the Claims

In column 9, lines 37-38, in Claim 9, delete "thermplastic" and insert -- thermoplastic --, therefor.

Signed and Sealed this  
Third Day of November, 2015

Michelle K. Lee  
*Director of the United States Patent and Trademark Office*